(12) United States Patent
Kottschlag et al.

(10) Patent No.: US 7,460,845 B2
(45) Date of Patent: Dec. 2, 2008

(54) RADIO RECEIVER SYSTEM HAVING TWO RECEIVING ANTENNAS AND TWO RECEIVERS CONNECTED THERETO

(75) Inventors: Gerhard Kottschlag, Hildesheim (DE); Gerhard Pitz, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 10/586,505

(22) PCT Filed: Dec. 1, 2004

(86) PCT No.: PCT/EP2004/053195

§ 371 (c)(1),
(2), (4) Date: May 24, 2007

(87) PCT Pub. No.: WO2005/069507

PCT Pub. Date: Jul. 28, 2005

(65) Prior Publication Data

US 2007/0293168 A1 Dec. 20, 2007

(30) Foreign Application Priority Data

Jan. 17, 2004 (DE) .................. 10 2004 002 481

(51) Int. Cl.
*H04B 1/06* (2006.01)

(52) U.S. Cl. .............. 455/132; 455/279.1; 455/292
(58) Field of Classification Search ......... 455/132–135, 455/272, 274, 277.1, 277.2, 280, 292, 279.1; 343/853; 375/347

See application file for complete search history.

(56) References Cited

U.S. PATENT DOCUMENTS 7,200,375 B2 * 4/2007 Kottschlag et al. .......... 455/272
7,268,644 B2 * 9/2007 Kottschlag et al. .......... 333/126

FOREIGN PATENT DOCUMENTS

| DE | 25 14 181 | 10/1975 |
| DE | 35 10 580 | 9/1986 |
| DE | 37 41 698 | 6/1989 |

* cited by examiner

*Primary Examiner*—Nguyen Vo
(74) *Attorney, Agent, or Firm*—Kenyon & Kenyon LLP

(57) ABSTRACT

A radio receiver system, having two receiving antennas, two receivers, and a transformer transmitter, which is provided for the purpose of supplying radio signals of both antennas to each of the receivers, the transformer transmitter having a first winding and a second winding, wherein the two receiving antennas are connected to the end terminals of the first winding, and a first of the two receivers is connected to a center tap of the first winding and the second of the two receivers is connected to an end terminal of the second winding.

5 Claims, 1 Drawing Sheet

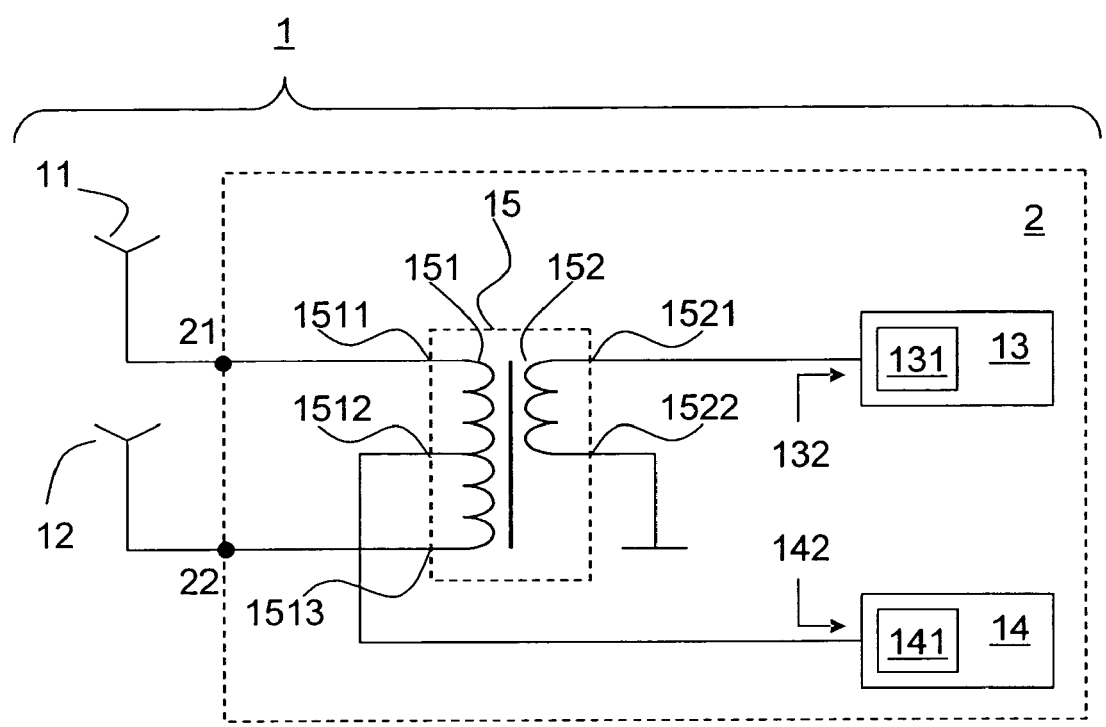
Fig.

RADIO RECEIVER SYSTEM HAVING TWO RECEIVING ANTENNAS AND TWO RECEIVERS CONNECTED THERETO

FIELD OF THE INVENTION

The present invention is directed to a radio receiver system having two receivers connected to two receiving antennas.

BACKGROUND INFORMATION

German Patent Application No. DE 101 30 234 describes a radio receiver system having two receiving antennas, having two receivers, and having a transformer transmitter having two windings, in which a first of the two receiving antennas is connected to a center tap of the first winding of the transformer, in which the end terminals of the first winding are connected to the two receivers, and in which the second of the two receiving antennas is connected to an end terminal of the second winding of the transmitter.

SUMMARY OF THE INVENTION

The radio receiver system according to the present invention represents an advantageous alternative variant to the radio receiver system described in German Patent Application No. DE 101 30 234. Because a step-down transformation of the antenna impedance occurs in the circuit of the transformer transmitter, the radio receiver system according to the present invention is particularly suitable for receivers which have a low input impedance in comparison to the antenna impedance. A low input impedance advantageously allows the use of SiGe bipolar transistors as receiver input stages, for example. A low input impedance of the connected receivers also causes increased input currents, which reduces the susceptibility to electromagnetic interference in particular and thus contributes to an increase of the immunity to interference of the receiver and therefore to improved receiving response. This is particularly significant when operating the receiver system under changing receiving conditions, during operation in a motor vehicle, for example.

BRIEF DESCRIPTION OF THE DRAWING

The FIGURE shows a block diagram of the part which is important to the present invention of a radio receiver system according to the present invention, having two receivers which are connected to two receiving antennas via a transformer transmitter, so that both receivers have the received signals of both receiving antennas available.

DETAILED DESCRIPTION

A radio receiver system according to the present invention will be described in the following using the example of a radio receiver intended for use in a motor vehicle, referred to in the following as an automobile radio. However, this does not indicate any restriction of the present invention to automobile radio devices; rather, the present invention is applicable in principle to any form of radio receiver.

Radio receiver system 1 according to the present invention has a first receiving antenna 11 and a second receiving antenna 12. The received signals of the two receiving antennas are supplied both to a first receiver 13 and to a second receiver 14 using an assignment circuit 15.

Assignment circuit 15 is implemented as a transformer transmitter for this purpose, which has a first winding 151 and a second winding 152. First winding 151 has three terminals, a first terminal 1511 corresponding to a first end terminal of first winding 151, a second terminal 1512 corresponding to a center tap of first winding 151, and a third terminal 1513 corresponding to a second end terminal of first winding 151. Second winding 152 has two end terminals 1521 and 1522. The number of turns per unit length of second winding 152 is at least approximately half of the number of turns per unit length of first winding 151.

The two receiving antennas 11 and 12 are connected to the two end terminals 1511 and 1513 of first winding 151 of transformer transmitter 15. One of the two end terminals 1521, 1522, in the present case first end terminal 1521 of second winding 152, is connected to the input of one of the two receivers 13, 14, first receiver 13 here. The other of the two end terminals of second winding 152, second end terminal 1522 here, is connected to a reference potential, the circuit ground here. Center tap 1512 of first winding 151 is connected to the input of one of the other two receivers 13, 14, i.e., second receiver 14 here.

The two receivers 13 and 14 and assignment circuit 15 are typically a component of an automobile radio device 2, whose antenna inputs 21 and 22 are connected to end terminals 1512 and 1513 of first winding 151 of transformer 15.

The described circuit system causes the received signals of both first antenna 11 and also second antenna 12 to be supplied both to first receiver 13 and also second receiver 14. Due to the distance of the two antennas from one another, radio signals are received by the two antennas with a phase offset. Since the sum signal of the two signals of antennas 11, 12 is supplied to one receiver 14, but, in contrast, the difference signal is applied to other receiver 13, the two receiver input signals are uncorrelated, i.e., combination with different phase relations results in the two receivers obtaining different input signals, which may be impaired to different degrees by signal dropouts and/or other interference. Therefore, for example, a diversity receiving operation, which is known per se, may be implemented using the two receivers, in which the signal having better reception quality is selected from the two received signals or, alternatively, an optimized sum signal is produced through suitable weighting of the individual signals. Such diversity receiving strategies are described, for example, in German Patent Application No. DE 25 14 181—changing over between the antennas therein—or German Patent Nos. DE 35 10 580, DE 37 41 698—addition of suitably weighted antenna signals into an optimized sum signal therein, so that reference is made to the cited documents in this regard.

The described circuit system also causes a step-down transformation of the impedances of receiving antennas 11 and 12; in the case of the ratio of the number of turns per unit length of first winding 151 to second winding 152 of approximately 2:1 selected in the present exemplary embodiment, the impedance is approximately halved. In order to ensure optimum utilization of the antenna signal power, impedance adaptation of input stages 131 and 141 of receivers 13 and 14 connected to antennas 11 and 12 is advantageous. In the case of the present step-down transformation of the antenna impedances, this means that input impedances 132 and 142 of input stages 131 and 141 of both receivers 13 and 14 are to be approximately half of antenna impedances 11 and 12. Instead of a power adaptation, a noise adaptation may also be provided.

The input stages of the vehicle receivers which are currently typical have high impedances, which result from narrow-band, high-resistance coarse filters for antenna signal selection and also field effect transistors typically provided at the input for decoupling the filter and signal amplification. A significantly reduced input impedance is almost impossible to be implemented with low outlay in this concept.

The use of bipolar transistors, such as SiGe transistors, suggests itself here. Bipolar transistors already have a lower input impedance than field effect transistors per se. However, it is to be considered in this case that bipolar transistors do not work well with high-resistance coarse filters and would significantly distort their filtering function.

However, for implementing a power adaptation or noise adaptation, it is conversely also possible to adapt the impedances of receiving antennas 11 and 12 appropriately to input impedances 132 and 142 of existing receivers 13 and 14. This allows the development and the use of novel, in particular even higher-resistance antenna structures, which typically have not been used in vehicles up to this point.

Both methods may also advantageously be combined with one another, specifically the selection of somewhat higher-resistance antennas than currently used antennas and simultaneously the connection of receivers which have a slightly reduced input impedance in relation to currently used receivers, so that a radical abandonment of current antenna and receiver concepts is not necessary.

What is claimed is:

1. A radio receiver system comprising:
   two receiving antennas;
   two receivers; and
   a transformer transmitter for supplying radio signals of both of the antennas to each of the receivers, the transformer transmitter having a first winding and a second winding, the two receiving antennas being connected to end terminals of the first winding, a first of the two receivers being connected to a center tap of the first winding and a second of the two receivers being connected to an end terminal of the second winding.

2. The radio receiver system according to claim 1, wherein the two receivers have input impedances which are about one-half of impedances of the antennas.

3. The radio receiver system according to claim 1, wherein the two receivers have bipolar transistors.

4. The radio receiver system according to claim 1, wherein the two receivers have SiGe bipolar transistors as input stages.

5. The radio receiver system according to claim 1, wherein the two receivers have components having low input impedances as input stages.

* * * * *